(12) United States Patent
Kushioka et al.

(10) Patent No.: US 10,469,110 B1
(45) Date of Patent: Nov. 5, 2019

(54) NOISE CANCELLER DEVICE (71) Applicant: HITACHI KOKUSAI ELECTRIC INC., Tokyo (JP)

(72) Inventors: Yoichi Kushioka, Tokyo (JP); Koji Yotsumoto, Tokyo (JP); Mitsuhiro Takashima, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/329,871

(22) PCT Filed: Aug. 24, 2017

(86) PCT No.: PCT/JP2017/030375
§ 371 (c)(1),
(2) Date: Jun. 28, 2019

(87) PCT Pub. No.: WO2018/051758
PCT Pub. Date: Mar. 22, 2018

(30) Foreign Application Priority Data

Sep. 14, 2016 (JP) ................................ 2016-179910

(51) Int. Cl.
*H04B 1/10* (2006.01)
*H04B 1/12* (2006.01)
(52) U.S. Cl.
CPC ..................................... *H04B 1/10* (2013.01)
(58) Field of Classification Search
CPC ......... H04B 1/10; H04B 1/1027; H04B 1/126
USPC .................................................... 455/276.1
See application file for complete search history.

(56) References Cited

U.S. PATENT DOCUMENTS 4,989,262 A * 1/1991 Saito ..................... H04B 1/10
375/349
2004/0131134 A1 7/2004 Hiroyasu
2016/0373145 A1 12/2016 Kushioka et al.

FOREIGN PATENT DOCUMENTS

| JP | 2002_353866 A | 12/2002 |
| JP | 2003_046419 A | 2/2003 |
| JP | 2015_170877 A | 9/2015 |

OTHER PUBLICATIONS

International Search Report dated Sep. 26, 2017.

* cited by examiner

*Primary Examiner* — Lee Nguyen
(74) *Attorney, Agent, or Firm* — Bacon & Thomas, PLLC (57) ABSTRACT

In a noise canceller device, interference signal adjustment units adjust delay, phase and amplitude of a signal received by a sub antenna under different conditions to obtain adjustment signals, and subtract the adjustment signals from a signal received by a main antenna to obtain differential signals. An average power calculation unit calculates an average power for each of the differential signals. An optimal condition search unit determines the values of delay, phase and amplitude that result in the minimum average power, and sets the values in an optimal interference signal adjustment unit. The optimal interference signal adjustment unit adjusts the signal received by the sub antenna using optimal values for delay, phase and amplitude to obtain an optimal adjustment signal. A cancellation unit subtracts the optimal adjustment signal from the signal received by the main antenna to remove interference signals, and outputs a desired signal to a host device.

7 Claims, 6 Drawing Sheets

NOISE CANCELLER DEVICE

FIELD OF THE INVENTION

The present invention relates to a noise canceller device in a wireless system; and, more particularly, to a noise canceller device capable of removing interference signals from another system accurately and stably.

BACKGROUND OF THE INVENTION

In a conventional wireless communication system, a desired signal interferes with a signal of another system, which may result in deterioration of a communication environment.

For example, in BS (Broadcasting Satellite) reception facilities having a BS antenna installed at each home, frequency conversion is often used to process a received signal. At that time, if radio waves leak from the reception facilities, interference may occur in a band of a cellular phone system.

A signal band of satellite broadcasting which becomes an interference signal is wider than the band of the cellular phone which is a desired signal and, thus, it is difficult to remove the interference signal by a filter or the like.

If the interference signal is already known, it is possible to generate a replica as a reference and remove the interference signal. However, when a replica of the interference signal cannot be prepared, it is difficult to remove only the interference signal.

When the interference signal cannot be removed, the communication quality of a cellular phone which is a desired signal deteriorates.

When the interference signal is a leakage signal from a BS antenna, an interference signal is steadily transmitted from a fixed place. When the desired signal is a signal of a cellular phone, the desired signal is intermittently transmitted from various places.

In other words, a communication environment in which the interference signal is steadily present and the desired signal is intermittently present is obtained.

As for a conventional noise canceller device, there is known "noise canceller device" disclosed in Japanese Patent Application Publication No. 2015-170877 (Hitachi Kokusai Electric Inc.: Patent Document 1).

Patent Document 1 discloses a technique for acquiring information on interference signals received by a plurality of sub antennas by performing correlation processing of the interference signals, combining the received interference signals based on the information, acquiring information on the interference signals included in the received signal by performing correlation processing of a signal received by a main antenna and the combined signal, generating an interference signal replica based on the information, and removing the interference signals by subtracting the interference signal replica from the received signal.

Patent Document 1: Japanese Patent Application Publication No. 2015-170877

However, the conventional noise canceller device does not sufficiently consider the accurate and stable removal of the interference signals in an environment where the interference signal is steadily present and the desired signal is not steadily present.

SUMMARY OF THE INVENTION

In view of the above, the present invention provides a noise canceller device capable of removing the interference signals accurately and stably in the environment where the interference signals are steadily present and the desired signal is not steadily present.

In accordance with an aspect of the present invention, there is provided a noise canceller device for removing an interference signal from a received signal. The noise canceller device comprises: a first antenna configured to receive a desired signal; a second antenna configured to receive an interference signal; a plurality of interference signal adjustment units configured to adjust a delay, a phase, and an amplitude of the signal received by the second antenna; a plurality of adders provided to respectively correspond to the plurality of interference signal adjustment units and configured to output differential signals by subtracting outputs of the respective interference signal adjustment units from the signal received by the first antenna; a plurality of average power calculation units provided to respectively correspond to the plurality of adders and configured to calculate an average power of the differential signals; an optimal condition search unit configured to determine values of the delay, the phase and the amplitude which result in the minimum average power as optimal conditions based on the outputs of the average power calculation units; an optimal interference signal adjustment unit configured to adjust the signal received by the second antenna based on the optimal conditions; and a cancellation unit configured to subtract the output of the optimal interference signal adjustment unit from the signal received by the first antenna.

In the noise canceller device, a group of the interference signal adjustment unit, the optimal condition search unit and the optimal interference signal adjustment unit is provided for each of a delay, a phase and an amplitude, the first group for any one of the delay, the phase and the amplitude, the second group for another one of the delay, the phase and the amplitude except for the one of the first group, and the third group for the remaining one of the delay, the phase and the amplitude are connected in that order, an output of the optimal interference signal adjustment unit of the first group is inputted into the interference signal adjustment unit and the optimal interference signal adjustment unit of the second group, an output of the optimal interference signal adjustment unit of the second group is inputted into the interference signal adjustment unit and the optimal interference adjustment unit of the third group, and the cancellation unit subtracts an output of the optimal interference signal adjustment unit of the third group from the signal received by the first antenna.

In accordance with another aspect of the present invention, there is provided a noise canceller device for removing an interference signal from a received signal. The noise canceller device comprises: a first antenna configured to receive a desired signal; a second antenna configured to receive an interference signal; a plurality of interference signal adjustment units configured to adjust a delay, a phase and an amplitude of the signal received by the first antenna; a plurality of adders provided to respectively correspond to the plurality of interference signal adjustment units and configured to output differential signals by subtracting the signal received by the second antenna from outputs of the respective interference signal adjustment units; a plurality of average power calculation units provided to respectively correspond to the plurality of adders and configured to calculate an average power of the differential signals; an optimal condition search unit configured to determine values of the delay, the phase and the amplitude which result in the minimum average power as optimal conditions based on the outputs of the average power calculation units; an optimal interference signal adjustment unit configured to adjust the signal received by the first antenna based on the optimal conditions; and a cancellation unit configured to subtract the output of the optimal interference signal adjustment unit from the signal received by the second antenna.

In the noise canceller device, a cycle of calculating an average power value in the average power calculation unit is variable.

In accordance with still another aspect of the present invention, there is provided a noise canceller device for removing an interference signal from a received signal. The noise canceller device comprises: a first antenna configured to receive a desired signal; a second antenna configured to receive an interference signal; an interference signal adjustment unit configured to adjust a delay, a phase and an amplitude of the signal received by the second antenna based on a value set in a time-sharing manner; an adder configured to output differential signals by subtracting outputs of the interference signal adjustment unit from the signal received by the first antenna; an average power calculation unit configured to calculate an average power of the differential signals; an optimal condition search unit configured to store outputs of the average power calculation unit in a time-sharing manner and determine values of a delay, a phase and an amplitude which result in the minimum average power as optimal conditions; an optimal interference signal adjustment unit configured to adjust the signal received by the second antenna based on the optimal conditions; a cancellation unit configured to subtract the output of the optimal interference signal adjustment unit from the signal received by the first antenna; and a control unit configured to set values of the delay, the phase and the amplitude at a time-sharing timing in the interference signal adjustment unit and instructing the time-sharing timing to the average power calculation unit and the optimal condition search unit.

Effect of the Invention

The noise canceller device comprises: a first antenna configured to receive a desired signal; a second antenna configured to receive an interference signal; a plurality of interference signal adjustment units configured to adjust a delay, a phase, and an amplitude of the signal received by the second antenna; a plurality of adders provided to respectively correspond to the plurality of interference signal adjustment units and configured to output differential signals by subtracting outputs of the respective interference signal adjustment units from the signal received by the first antenna; a plurality of average power calculation units provided to respectively correspond to the plurality of adders and configured to calculate an average power of the differential signals; an optimal condition search unit configured to determine values of the delay, the phase and the amplitude which result in the minimum average power as optimal conditions based on the outputs of the average power calculation units; an optimal interference signal adjustment unit configured to adjust the signal received by the second antenna based on the optimal conditions; and a cancellation unit configured to subtract the output of the optimal interference signal adjustment unit from the signal received by the first antenna. Therefore, the interference signal can be accurately and stably removed in an environment where the interference signal is steadily present and the desired signal is intermittently present.

In the noise canceller device, a group of the interference signal adjustment unit, the optimal condition search unit and the optimal interference signal adjustment unit is provided for each of a delay, a phase and an amplitude, the first group for any one of the delay, the phase and the amplitude, the second group for another one of the delay, the phase and the amplitude except for the one of the first group, and the third group for the remaining one of the delay, the phase and the amplitude are connected in that order, an output of the optimal interference signal adjustment unit of the first group is inputted into the interference signal adjustment unit and the optimal interference signal adjustment unit of the second group, an output of the optimal interference signal adjustment unit of the second group is inputted into the interference signal adjustment unit and the optimal interference adjustment unit of the third group, and the cancellation unit subtracts an output of the optimal interference signal adjustment unit of the third group from the signal received by the first antenna. Therefore, the optimal values of the parameters of the delay, the phase and the amplitude can be obtained independently, and the interference signal can be removed with a higher accuracy.

The noise canceller device comprises: a first antenna configured to receive a desired signal; a second antenna configured to receive an interference signal; a plurality of interference signal adjustment units configured to adjust a delay, a phase and an amplitude of the signal received by the first antenna; a plurality of adders provided to respectively correspond to the plurality of interference signal adjustment units and configured to output differential signals by subtracting the signal received by the second antenna from outputs of the respective interference signal adjustment units; a plurality of average power calculation units provided to respectively correspond to the plurality of adders and configured to calculate an average power of the differential signals; an optimal condition search unit configured to determine values of the delay, the phase and the amplitude which result in the minimum average power as optimal conditions based on the outputs of the average power calculation units; an optimal interference signal adjustment unit configured to adjust the signal received by the first antenna based on the optimal conditions; and a cancellation unit configured to subtract the output of the optimal interference signal adjustment unit from the signal received by the second antenna. Therefore, the interference signal can be removed accurately and stably in an environment where the interference signal is steadily present and the desired signal is intermittently present.

Further, in accordance with the present invention, the noise canceller device varies the cycle of calculating the value of the average power in the average power calculation unit. Accordingly, it is possible to set the averaging period depending on the actual communication environment and also possible to accurately remove the interference signal.

The noise canceller device comprises: a first antenna configured to receive a desired signal; a second antenna configured to receive an interference signal; an interference signal adjustment unit configured to adjust a delay, a phase and an amplitude of the signal received by the second antenna based on a value set in a time-sharing manner; an adder configured to output differential signals by subtracting outputs of the interference signal adjustment unit from the signal received by the first antenna; an average power calculation unit configured to calculate an average power of the differential signals; an optimal condition search unit configured to store outputs of the average power calculation unit in a time-sharing manner and determine values of a delay, a phase and an amplitude which result in the minimum average power as optimal conditions; an optimal interference signal adjustment unit configured to adjust the signal received by the second antenna based on the optimal conditions; a cancellation unit configured to subtract the output of the optimal interference signal adjustment unit from the signal received by the first antenna; and a control unit configured to set values of the delay, the phase and the amplitude at a time-sharing timing in the interference signal adjustment unit and instructing the time-sharing timing to the average power calculation unit and the optimal condition search unit. Therefore, the interference signal can be removed accurately and stably while suppressing the increase in the scale and the cost of the circuit.

DETAILED DESCRIPTION OF THE EMBODIMENTS

Hereinafter, embodiments will be described in detail with reference to the accompanying drawings.

(Outline of the Embodiments)

A noise canceller device according to an embodiment of the present invention includes a main antenna that receives a desired signal and a sub antenna that receives an interference signal. The signal received by the sub antenna is divided into a plurality of signals. The delay, the phase and the amplitude of the signals are adjusted under different conditions. The adjusted signals are subtracted from the signal received by the main antenna. The average power of the subtraction result is calculated at a specific cycle, and the conditions of the delay, the phase and the amplitude which result in the minimum average power are determined. The signal received by the sub antenna is adjusted under the determined conditions of the delay, the phase and the amplitude, and is subtracted from the signal received by the main antenna. The signal received by the sub antenna is adjusted such that the components thereof become close to those of the interference signals included in the signal received by the main antenna, and is subtracted from the signal received by the main antenna. Accordingly, the interference signals can be removed accurately and stably in a communication environment in which there is a difference in steady state between the interference signals and the desired signal.

Figure 1:
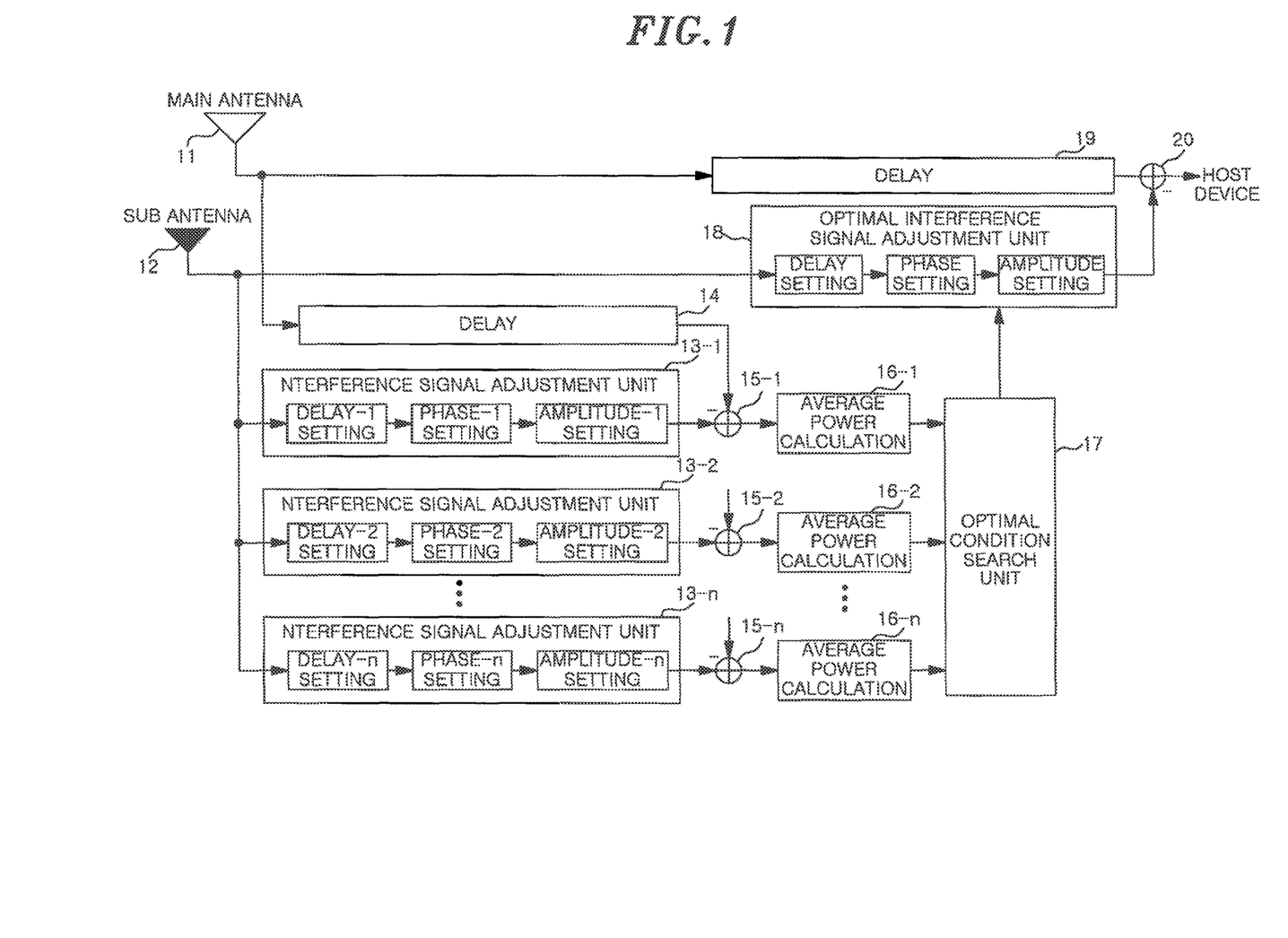
FIG. 1 is a block diagram showing a configuration of a noise canceller device according to a first embodiment.

(Configuration of the First Noise Canceller Device: FIG. 1)

A noise canceller device according to a first embodiment of the present invention will be described with reference to FIG. 1. FIG. 1 is a block diagram showing a configuration of the noise canceller device according to the first embodiment of the present invention.

As shown in FIG. 1, the noise canceller device (first noise canceller device) according to the first embodiment of the present invention includes: a main antenna 11, a sub antenna 12, a plurality of interference signal adjustment units 13 (13-1 to 13-*n*), a delay unit 14, a plurality of adders 15 (15-1 to 15-*n*), a plurality of average power calculation units 16 (16-1 to 16-*n*), an optimal condition search unit 17, an optimal interference signal adjustment unit 18, a delay unit 19, and a cancellation unit 20.

The cancellation unit 20 is connected to a host device that performs information processing of a signal.

The respective components of the first noise canceller device will be described.

(Main Antenna 11)

The main antenna 11 receives a desired signal, specifically a wireless signal of a cellular phone. However, an interference signal (leakage signal from a BS antenna) of another system is mixed in the main antenna 11. The main antenna 11 corresponds to a first antenna to be described in claims.

(Sub Antenna 12)

The sub antenna 12 receives an interference signal. However, the sub antenna 12 receives not only the interference signal but also the desired signal and other signals. The sub antenna 12 corresponds to a second antenna to be described in the claims.

Here, the desired signal of the cellular phone is intermittently present and has a low steady state, whereas the interference signal is constantly present and has a high steady state.

The first noise canceller device adjusts the signal received by the sub antenna 12 such that the components thereof become close to those of the interference signals included in the signal received by the main antenna 11, and then subtracts (removes) it from the signal received by the main antenna 11, thereby cancelling the interference signals from the signal received by the main antenna 11.

(Interference Signal Adjustment Unit 13)

The interference signal adjustment units 13-1 to 13-*n* include a delay adjustment unit for adjusting delay, a phase adjustment unit for adjusting a phase, and an amplitude adjustment unit for adjusting an amplitude. The interference signal adjustment units 13-1 to 13-*n* adjust parameters of the delay, the phase and the amplitude of the signal received by the sub antenna 12. The delay, the phase and the amplitude may be adjusted in any order.

The values of the delay, the phase and the amplitude are set in the interference signal adjustment units 13-1 to 13-*n* by an operation unit and a control unit (both not shown). The interference signal adjustment units 13-1 to 13-*n* adjust the signal received by the sub antenna 12 under different conditions of the delay, the phase and the amplitude.

In the example of FIG. 1, the interference signal adjustment unit 13-1 adjusts the signal received by the sub antenna 12 to values of "delay 1," "phase 1" and "amplitude 1" and the interference signal adjustment unit 13-*n* adjusts the signal received by the sub antenna 12 to values of "delay n," "phase n" and "amplitude n."

The ranges of the parameters of the delay, the phase and the amplitude which are set in the interference signal adjustment unit 13 are determined in consideration of the reception environment and the device configuration.

For example, when a cable length from the main antenna 11 to the noise canceller device is considerably different from that from the sub antenna 12 to the noise canceller device, the delay adjustment range is set widely.

When a device such as an amplifier is provided between the main antenna 11, the sub antenna 12 and the noise canceller device and, thus, a level difference is generated therebetween, the amplitude adjustment range is set widely.

(Delay Unit 14)

The delay unit 14 delays the signal received by the main antenna 11 by the processing time in the interference signal adjustment unit 13, and outputs the delayed signal to the adders 15-1 to 15-n.

(Adder 15)

The adders 15-1 to 15-n subtract the outputs of the respective interference signal adjustment units 13-1 to 13-n from the signal that has been received by the main antenna 11 and delayed by the delay unit 14, and output differential signals.

(Average Power Calculation Unit 16)

The average power calculation units 16-1 to 16-n receive the respective differential signals from the adders 15-1 to 15-n, average the differential signals at a specific cycle (period), and calculate an average power of the differential signals.

Here, the averaging cycle in the average power calculation unit 16 will be described.

In the communication environment in which the first noise canceller device is used, the interference signal is present steadily, whereas the desired signal is present intermittently. Therefore, the average power calculation unit 16 performs averaging during a sufficiently long period so that the contribution of the desired signal to the average power becomes sufficiently smaller than that of the interference signal and only the interference signal can be monitored.

In other words, in the noise canceller device of the present embodiment, the averaging cycle in the average power calculation unit 16 is set to be sufficiently long so that a sufficient difference can be obtained between the steadily received interference signal and the intermittently received desired signal.

According, the cancellation unit 20 to be described later can cancel only the interference wave.

The calculation cycle of the average power is determined such that a difference between the interference signal and the desired signal can be obtained depending on the intermittence of the desired signal and the steady state of the interference signal. The calculation cycle of the average power is set by the average power calculation unit 16 through the control unit (not shown).

For example, when the interference signal has a high steady state, the calculation cycle can become shorter than that obtained when the interference signal has a low steady state. When the desired signal has a high intermittence (the frequency of receiving the desired signal is low), the calculation cycle can become shorter than that obtained when the desired signal has a low intermittence (the frequency of receiving the desired signal is high.)

(Optimal Condition Search Unit 17)

The optimal condition search unit 17 inputs and compares all the average powers from the average power calculation units 16-1 to 16-n, specifies a minimum average power among the average powers from the average power calculation unit 16, and determines the conditions of the delay, the phase and the amplitude in the interference signal adjustment unit 13 corresponding to the average power calculation unit 16 as optimal conditions. The values of the delay, the phase and the amplitude which are set in the interference signal adjustment units 13-1 to 13-n corresponding to the average power calculation units 16-1 to 16-n are stored in advance in the optimal search unit 17.

The optimal condition search unit 17 sets the values of the parameters of the delay, the phase and the amplitude which are determined as the optimal conditions in the optimal interference signal adjustment unit 18.

Figure 2A:
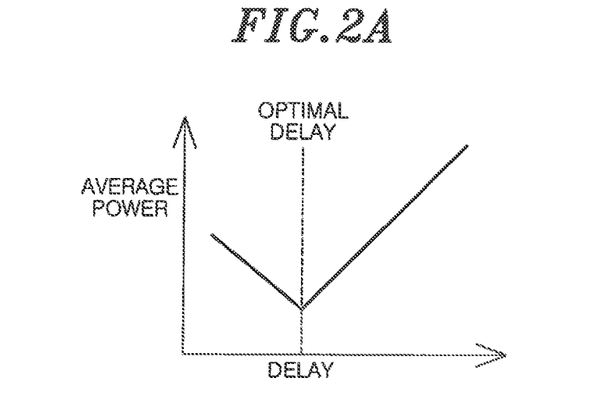
FIGS. 2A to 2C explain relation between parameters and an average power of a differential signal in the first noise canceller device.
Figure 2B:
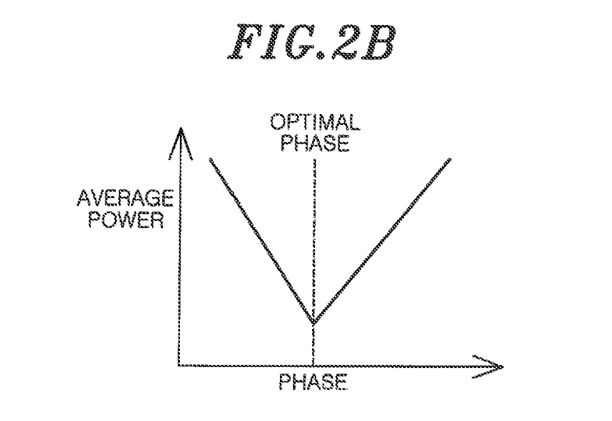
Figure 2C:
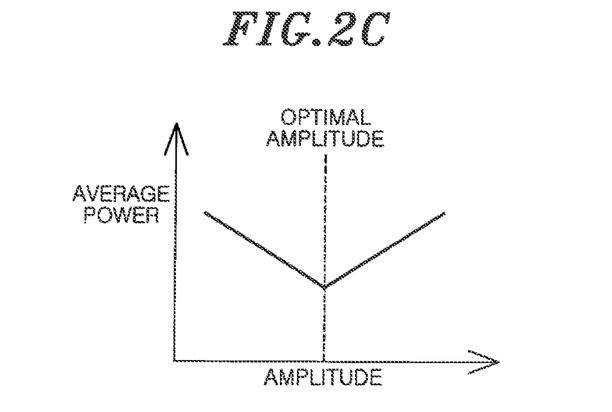

(Change in the Average Power: FIGS. 2A to 2C)

Here, the relation between the parameters and the average power of the differential signals will be described with reference to FIGS. 2A to 2C. FIGS. 2A to 2C explain the relation between the parameters and the average power of the differential signals in the noise canceller device according to the embodiment of the present invention.

As described above, the signal received by the main antenna 11 includes a desired signal and an interference signal. As shown in FIG. 1, the adder 14 outputs the differential signal by subtracting an adjustment signal that is obtained by adjusting the signal received by the sub antenna 12 by the interference signal adjustment unit 13 from the signal received by the main antenna 11.

Therefore, when the adjustment signal is adjusted such that the components thereof becomes closest to those of the interference signal included in the signal received by the main antenna 11, the interference signal is canceled with high accuracy and, thus, the average power of the differential signal becomes minimum.

In other words, when the average power of the differential signal is minimum, the components of the adjustment signal outputted from the interference signal adjustment unit 13 are closest to those of the interference signal included in the signal received by the main antenna 11. The values of the parameters at that time are the optimal values.

FIG. 2A shows changes in the average power of the differential signal in the case of using the delay as a parameter. The delay amount that results in the minimum average power is set to an optimal delay.

Similarly, FIG. 2B shows changes in the average power of the differential signal in the case of using the phase as a parameter. FIG. 2C shows changes in the average power of the differential signal in the case of using the amplitude as a parameter. The values obtained when the average powers are minimum are respectively set to an optimal phase and an optimal amplitude.

The optimal condition search unit 17 of the first noise canceller device selects an optimal group among the n-number of groups of "delay, phase and amplitude" and sets the values of the parameters in the selected group to optimal values, instead of independently determining the optimal values of the parameters of the delay, the phase and the amplitude shown in FIGS. 2A to 2C.

(Optimal Interference Signal Adjustment Unit 18)

The optimal interference signal adjustment unit 18 generates an optimal adjustment signal by adjusting the values of the delay, the phase and the amplitude of the signal received by the sub antenna 12 to the values set by the optimal condition search unit 17.

(Delay Unit 19)

The delay unit 19 delays the signal received by the main antenna 11 to be matched with an output timing of the optimal adjustment signal from the optimal interference adjustment unit 18. The delay time is preset in consideration of time required for the process for generating the optimal adjustment signal.

(Cancellation Unit 20)

The cancellation unit 20 removes the interference signal by subtracting the output of the optimal interference signal adjustment unit 18 from the signal that has been received by the main antenna 11 and delayed by the delay unit 19, and outputs the desired signal to the host device.

The delay, the phase and the amplitude of the optimal adjustment signal from the optimal interference adjustment unit 18 are adjusted such that the components thereof become close to those of the interference signal included in the main antenna 11. Therefore, the cancellation unit 20 cancels the interference signal included in the signal received by the main antenna 11, and only the desired signal is outputted to the host device.

(Operation of the First Noise Canceller Device: FIG. 1)

Next, the operation of the first noise canceller device will be described with reference to FIG. 1.

In the first noise canceller device, the main antenna 11 receives the desired signal including the interference signal, and the sub antenna 12 receives the interference signal including the desired signal.

The signal received by the sub antenna 12 is divided into the n-number of signals and inputted into the interference signal adjustment units 13-1 to 13-$n$. Then, they are outputted as adjustment signals whose delay, phase and amplitude are adjusted, and then inputted into the adder 15-1 to 15-$n$, respectively.

The signal received by the main antenna 11 is delayed by the delay unit 14 and inputted into the adders 15-1 to 15-$n$. The adders 15-1 to 15-$n$ subtract the adjustment signals adjusted by the signal adjustment units 13-1 to 13-$n$ from the signal received by the main antenna 11, and output differential signals.

The differential signals are inputted into the average power calculation units 16-1 to 16-$n$ and averaged at a specific cycle. Accordingly, the n-number of average powers are outputted and inputted into the optimal condition search unit 17.

The group of the optimal parameters is determined by the optimal condition search unit 17 and set in the optimal interference signal adjustment unit 18. The optimal interference signal adjustment unit 18 adjusts the delay, the phase and the amplitude of the signal received by the sub antenna 12.

The cancellation unit 20 cancels the interference signal by subtracting the output of the optimal interference signal adjustment unit 18 from the signal that has been received by the main antenna 11 and delayed by the delay unit 19, and outputs the desired signal to the host device.

In this manner, the operation of the first noise canceller device is performed.

(Effect of the First Embodiment)

In accordance with the first noise canceller device, the interference signal adjustment units 13 adjust the delay, the phase and the amplitude of the signal received by the sub antenna 12 under different conditions and to obtain the adjustment signals; the differential signals are obtained by subtracting the adjustment signals from the signal received by the main antenna 11; the average power calculation unit 16 calculates the average power of the differential signals; the optimal condition search unit 17 compares the average powers, determines the delay, the phase and the amplitude which result in the minimum average power, and sets the determined values in the optimal interference signal adjustment unit 18; the optimal interference signal adjustment unit 18 adjusts the signal received by the sub antenna 12 to the optimal adjustment signal under the optimal conditions of the delay, the phase and the amplitude; and the cancellation unit 20 removes the interference signal by subtracting the optimal adjustment signal from the signal received by the main antenna 11 and outputs only the desired signal to the host device. Accordingly, when the desired signal is unsteadily present and the interference signal is steadily present, the interference signal can be cancelled accurately and stably.

Especially, in the first noise canceller device, the adjustment signal adjusted by the interference signal adjustment unit 13 is actually subtracted from the signal received by the main antenna 11. As a result, the optimal parameter group is set in the optimal interference signal adjustment unit 18, which makes it possible to perform the cancellation operation accurately and stably.

This is also applied to noise canceller devices according to other embodiments which will be described later.

On the assumption that the desired signal is a narrowband signal and the interference signal is a wideband signal, if the desired signal and the interference signal have the same power per unit band, the power of the interference signal becomes greater. Therefore, it is possible to more accurately monitor and cancel the interference signal.

Figure 3:
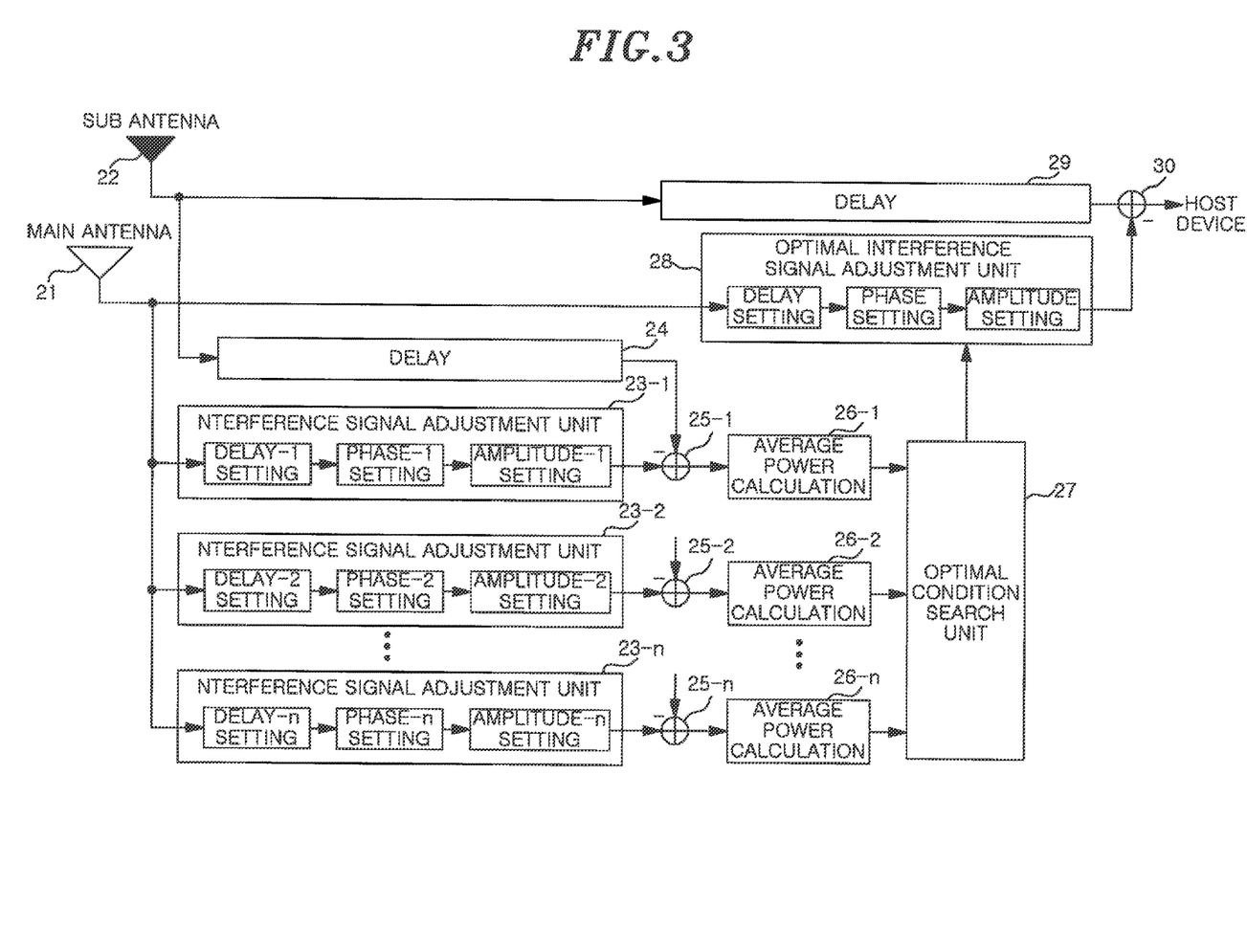
FIG. 3 is a block diagram showing a configuration of a second noise canceller device.

(Second Noise Canceller Device: FIG. 3)

Next, a noise canceller device (second noise canceller device) according to a second embodiment of the present invention will be described with reference to FIG. 3. FIG. 3 is a block diagram showing a configuration of the second noise canceller device.

In the above-described first noise canceller device, the delay, the phase and the amplitude of the signal received by the sub antenna 12 are adjusted. However, in the second noise canceller device, the interference signal included in the signal received by the main antenna 11 is removed by adjusting the signal received by the main antenna such that the components of the interference signal included in the signal received by the main antenna 11 become close to those of the interference signal received by the sub antenna 12.

As shown in FIG. 3, the components of the second noise canceller device are the same as those of the first noise canceller device shown in FIG. 1 except that the signal received by the main antenna 21 is divided into a plurality of signals and inputted into the interference signal adjustment units 24-1 to 24-$n$ and the adjustment signals that have been subjected to the adjustment of the delay, the phase and the amplitude are outputted.

The operations of the components are the same as those of the first noise canceller device shown in FIG. 1.

The adders 25-1 to 25-$n$ output the differential signals by subtracting the signal that has been received by the sub antenna 22 and delayed by the delay unit 24 from the adjustment signals. The average power calculation units 26-1 to 26-$n$ average the differential signals at a specific cycle and calculate the average power of the differential signals.

The average power is inputted into the optimal condition search unit 27. The optimal condition search unit 27 selects the conditions of the delay, the phase and the amplitude of the interference signal adjustment unit 23 which result in the minimum average power. The selected conditions are set as the optimal conditions in the optimal interference signal adjustment unit 28.

In the second noise canceller device, the conditions that result in the minimum average power are used for adjusting the interference signal included in the signal received by the main antenna 21 such that the components thereof become close to those of the interference signal received by the sub antenna 22.

The optimal interference signal adjustment unit 28 adjusts the delay, the phase and the amplitude of the signal received by the main antenna 21. The cancellation unit 30 removes the interference signal from the signal received by the main antenna 21 by subtracting the signal received by the sub antenna 22 from the adjusted signal, and outputs only the desired signal to the host device.

(Effects of the Second Embodiment)

In accordance with the second noise canceller device, the optimal condition search unit 27 determines the conditions of the delay, the phase and the amplitude which make the components of the signal received by the main antenna 21 close to those of the interference signal received by the sub antenna 22; the optimal interference signal adjustment unit 28 adjusts the signal received by the main antenna 21 under the determined conditions and outputs the optimal adjustment signal; and the cancellation unit 30 subtracts the optimal adjustment signal from the signal received by the main antenna 21. Accordingly, the interference signal can be removed from the signal received by the main antenna 21 accurately and stably in an environment where the desired signal is unsteadily present and the interference signal is steadily present.

The second noise canceller device can obtain the same cancellation effect as that of the first noise canceller device.

Figure 4:
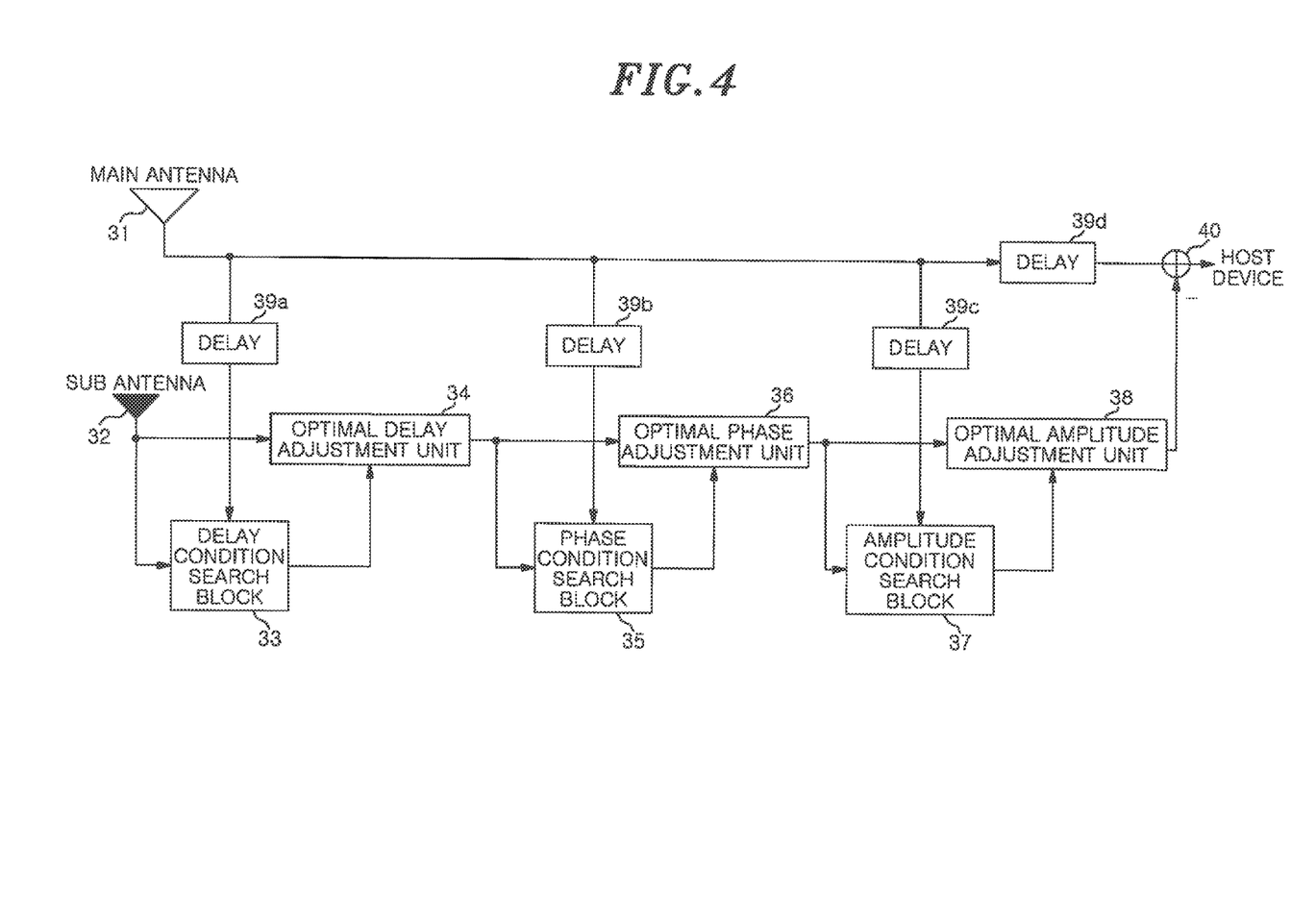
FIG. 4 is a block diagram schematically showing a configuration of a third noise canceller device.

(Third Noise Canceller Device: FIG. 4)

Next, a noise canceller device (third noise canceller device) according to a third embodiment of the present invention will be described with reference to FIG. 4. FIG. 4 is a block diagram schematically showing the third noise canceller device.

The first and the second noise canceller device adjust the parameters of the delay, the phase and the amplitude, calculate the average power, and obtain the optimal value. However, the third noise canceller device sequentially searches the optimal values of the delay, the phase and the amplitude.

As shown in FIG. 4, the third noise canceller device includes the main antenna 31, the sub antenna 32, the delay condition search block 33 for searching for an optimal delay condition, the phase condition search block 35 for searching for an optimal phase condition, an optimal amplitude search block 37 for searching an optimal amplitude condition. The third noise canceller device further includes an optimal delay adjustment unit 34, an optimal phase adjustment unit 36, and an optimal amplitude adjustment unit 38 for sequentially adjusting the signal received by the sub antenna 32 under the conditions searched by the respective search blocks.

The third noise canceller device further includes delay units 39a to 39d for adequately delaying the signal received by the main antenna 31, and a cancellation unit 40.

The delay condition search block 33 basically includes the interference signal adjustment units 13-1 to 13-n, the adders 15-1 to 15-n, the average power calculation units 16-1 to 16-n, and the optimal condition search unit 17, which are shown in FIG. 1. However, the interference signal adjustment unit of the delay condition search block 33 includes only the delay adjustment unit and does not include the phase adjustment unit and the amplitude adjustment unit.

The phase condition search block 35 has the same configuration as that of the delay condition search block 33 except that it includes the phase adjustment unit instead of the delay adjustment unit.

Similarly, the amplitude condition search block 37 includes the amplitude adjustment unit.

The delay condition search block 33 searches for an optimal delay condition by using the signal received by the sub antenna 32 and the signal that has been received by the main antenna 31 and delayed by the delay unit 39a.

The optimal delay adjustment unit 34 adjusts the delay amount of the signal received by the sub antenna 32 to the optimal delay amount determined by the delay condition search block 33, and outputs the signal whose delay has been adjusted to the phase condition search block 35.

The phase condition search block 35 searches for an optimal phase condition by using the output signal of the optimal delay adjustment unit 34 whose delay has been adjusted and the signal that has been received by the main antenna 31 and delayed by the delay unit 39b.

The optimal phase adjustment unit 36 adjusts the phase of the output signal of the optimal delay adjustment unit 34 to the optimal phase determined by the phase condition search block 35 and outputs the signal whose delay and phase have been adjusted to the amplitude condition search block 37.

The amplitude condition search block 37 searches for an optimal amplitude condition by using the output signal of the optimal phase adjustment unit 36 whose delay and phase have been adjusted and the signal that has been received by the main antenna 31 and delayed by the delay unit 39c.

The optimal amplitude adjustment unit 38 adjusts the amplitude of the output signal of the optimal phase adjustment unit 36 to the optimal amplitude determined by the amplitude condition search block 37, and outputs it to the cancellation unit 40. The output signal of the optimal amplitude adjustment unit 38 is the optimal adjustment signal whose delay, phase and amplitude have been adjusted.

The cancellation unit 40 removes the interference signal included in the signal received by the main antenna 31 by subtracting the optimal adjustment signal from the optimal amplitude adjustment unit 38 from the reception signal that has been received by the main antenna 31 and delayed by the delay unit 39d.

In other words, in the third noise canceller device, the group of the interference signal adjustment unit, the optimal condition search unit, and the optimal interference signal adjustment unit is provided for each parameter of the delay, the phase, and the amplitude, and the groups are sequentially connected.

In the example of FIG. 4, the search for conditions of the parameters and the adjustment using the optimal values are performed in the order of the delay, the phase and the amplitude. However, the order may vary.

Further, the signal received by the main antenna 31 may be similarly adjusted for each parameter of the delay, the phase and the amplitude.

(Effect of the Third Embodiment)

In accordance with the third noise canceller device, it is possible to accurately determine the optimal conditions of the parameters of the delay, the phase and the amplitude, and remove the interference signal from the signal received by the main antenna 31 accurately and stably.

Figure 5:
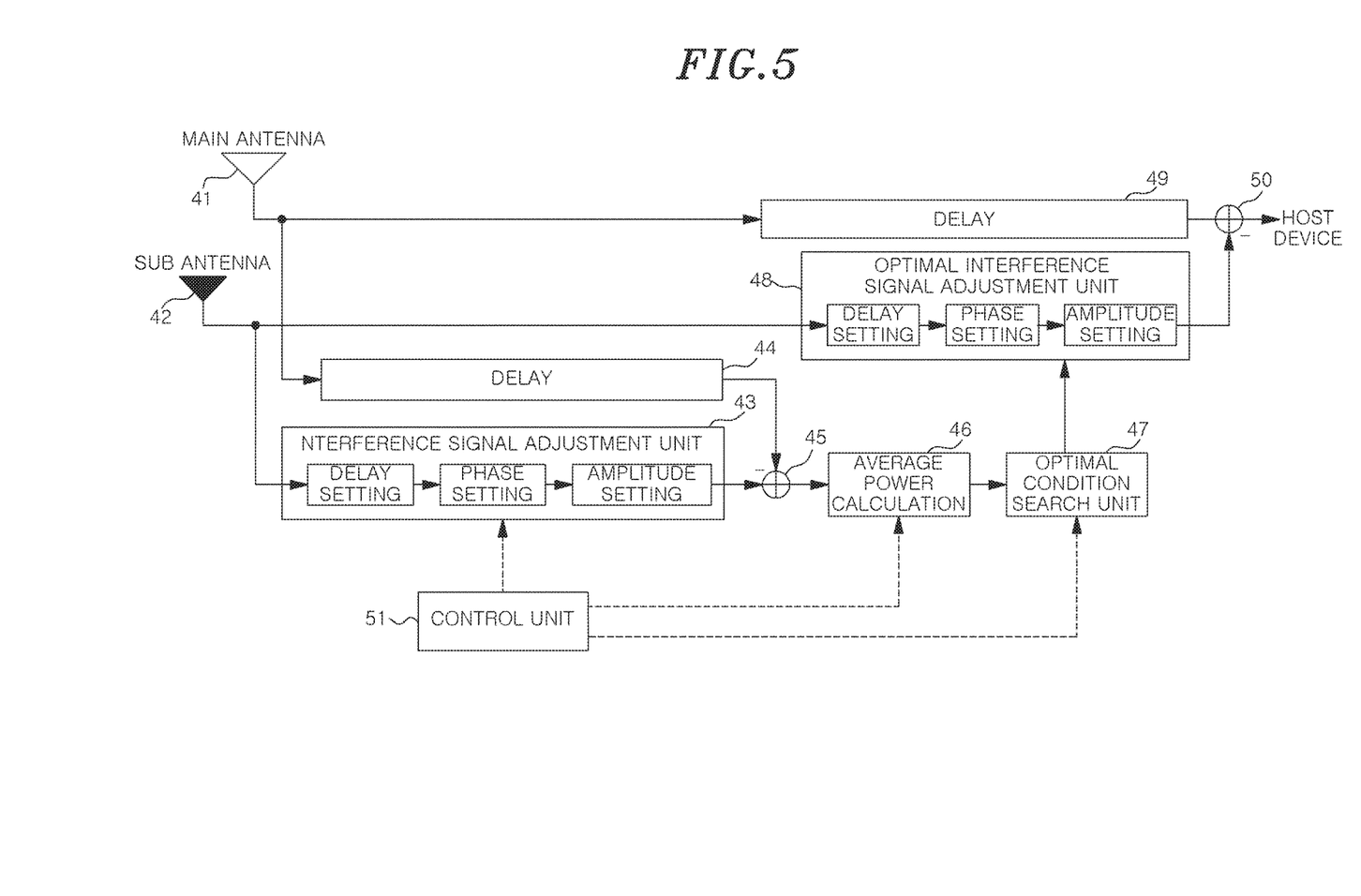
FIG. 5 is a block diagram showing a configuration of a fourth noise canceller device.

(Fourth Noise Canceller Device: FIG. 5)

Next, a noise canceller device (fourth noise canceller device) according to a fourth embodiment of the present invention will be described with reference to FIG. 5. FIG. 5 is a block diagram showing a configuration of the fourth noise canceller device.

In the above-described first noise canceller device, the plurality of interference signal adjustment units 13-1 to 13-n perform processing in parallel. However, in the fourth noise canceller device, one interference signal adjustment unit sets and adjusts the parameters in a time-sharing manner.

Specifically, as shown in FIG. 5, the fourth noise canceller device is characterized in that it includes an interference signal adjustment unit 43 for adjusting a delay, a phase and an amplitude, an average power calculation unit 46 for calculating an average power of differential signals, an optimal condition search unit 47 for determining optimal conditions of the delay, the phase and the amplitude, and a control unit 51 for performing time-sharing control.

The interference signal adjustment unit 43 includes a delay setting unit, a phase setting unit and an amplitude setting unit, and adjusts the signal received by the sub antenna 42 based on the parameters set in a time-sharing manner by the control unit 51.

The control unit 51 changes the values of the parameters of the delay setting unit, the phase setting unit and the amplitude setting unit of the interference signal adjustment unit 44 at a preset time-sharing timing, and instructs the time-sharing timing to the average power calculation unit 46 and the optimal condition searching unit 47.

A plurality of groups (e.g., the n-number of groups) of the parameters of the delay, the phase and the amplitude is prepared in advance, and the control unit 51 sets the n-number of groups of parameters at different timings.

The adder 45 subtracts the adjustment signal adjusted by interference signal adjustment unit 43 from the signal that has been received by the main antenna 41 and delayed, and outputs differential signals.

The average power calculation unit 46 calculates the average power of the differential signals and outputs the average power to the optimal condition search unit 47 based on the timing from the control unit 51.

The optimal condition search unit 47 includes a storage unit that stores the n-number of average power values, and sequentially stores the inputted average power values. The optimal condition search unit 47 specifies a parameter corresponding to the inputted average power by counting the timing from the control unit 51, and stores it in a predetermined area.

In the case of storing the n-number of average power values, the optimal condition search unit 47 specifies the minimum average power, and determines the values of the delay, the phase and the amplitude corresponding thereto as the optimal conditions. Then, the determined optimal parameter values are outputted to the optimal interference signal adjustment unit 48.

The group of the n-number of parameters corresponding to the order (number) of time sharing is stored in advance in the optimal condition search unit 47. When the number of the parameter that results in the minimum average power is specified, the optimal condition search unit 47 may inquire of the control unit 51 the value of the parameter assigned with the specified number.

Further, the delay, the phase and the amplitude of the signal received by the main antenna 41 may be adjusted in a time-sharing manner.

(Effect of the Fourth Embodiment)

In accordance with the fourth noise canceller device, only one interference signal adjustment unit 43 is provided, and the control unit 51 performs adjustment by shifting the parameters in a time-sharing manner. Therefore, the scale and the cost of the circuit can be considerably reduced.

Figure 6:
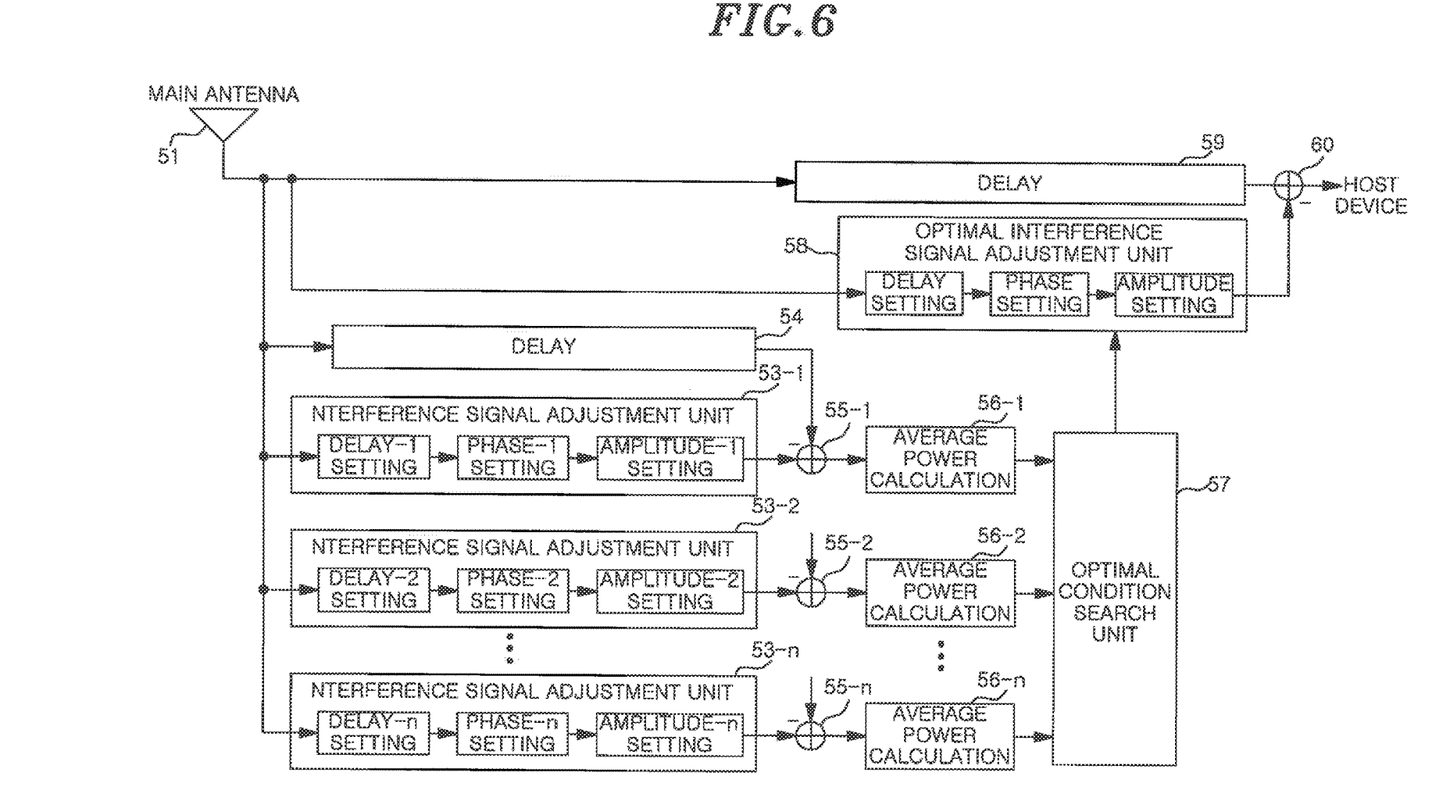
FIG. 6 is a block diagram showing a configuration of an application example of the first noise canceller device.

(Application Example: FIG. 6)

Next, an application example of the noise canceller device according to the embodiment of the present invention will be described with reference to FIG. 6. FIG. 6 is a block diagram showing a configuration of the application example of the first noise canceller device.

The first to the fourth noise canceller device include the main antenna and the sub antenna, and obtains the differential signal between the signal received by one of the antennas and the signal received by the other antenna by adjusting the delay, the phase and the amplitude of the signal received by the one antenna. However, in the application example, as shown in FIG. 6, only a main antenna 51 is provided, and the cancellation operation is performed by using a signal received by the main antenna 51.

Specifically, as shown in FIG. 6, in the application example of the first noise canceller device, the signal received by the main antenna 51 is divided into two systems. One is used as a main signal system and inputted into a delay unit 59 and an optimal interference signal adjustment unit 58. The other is processed as a system for generating an adjustment signal.

The signal of the other system is inputted into a plurality of interference signal adjustment units 53-1 to 53-n and a delay unit 54. The differential signals are outputted from adders 55-1 to 55-n, and the average power is calculated by average power calculation units 56-1 to 56-n.

An optimal condition search unit 57 determines the values of the delay, the phase and the amplitude which result in the minimum average power as optimal conditions. The optimal interference signal adjustment unit 58 adjusts the delay, the phase and the amplitude of the signal received by the main antenna 51 to the optimal conditions. The cancellation unit 60 cancels the interference signal from the signal received by the main antenna 51 by subtracting the output of the optimal interference signal adjustment unit 58 from the output of the delay unit 59.

Similarly, the second, the third, and the fourth noise canceller devices can be provided with only the main antenna.

Here, only one main antenna 51 for receiving the desired signal is provided. However, the present invention is not limited thereto, and any antenna may be used.

(Effect of the Application Example)

In accordance with the application example, only the main antenna 51 is provided as the antenna for receiving a signal; the signal received by the main antenna 51 is divided into two systems; a signal of one system is adjusted by the interference signal adjustment units 53-1 to 53-n; a differential signal between the adjusted signal and the delayed received signal is obtained; the average power calculation units 56-1 to 56-n determine the values of the delay, the phase and the amplitude which result in the minimum average power as the optimal conditions; and a signal of the other system is adjusted under the determined optimal conditions and canceled with the delayed received signal. Accordingly, the interference signal included in the signal can be accurately removed by a simple configuration.

INDUSTRIAL APPLICABILITY

The present invention can be applied to a high-frequency power supply device, a semiconductor manufacturing apparatus using the high-frequency power supply device, or the like. This application claims priority to Japanese Patent Application No. 2016-179910 filed on Sep. 14, 2016, the entire contents of which are incorporated herein by reference.

The present invention is suitable for a noise canceller device capable of removing an interference signal from other systems accurately and stably.

DESCRIPTION OF REFERENCE NUMERALS 11, 21, 31, 41, 51: main antenna
12, 22, 32, 42: sub antenna
13, 23, 43, 53: interference signal adjustment unit
14, 24, 44, 54: delay unit
15, 25, 45, 55: adder 16, 26, 46, 56: average power calculation unit
17, 27, 47, 57: optimal condition search unit
18, 28, 48, 58: optimal interference signal adjustment unit
19, 29, 39, 49, 59: delay unit
20, 30, 40, 50, 60: cancellation unit
33: delay condition search block
34: optimal delay adjustment unit
35: phase condition search block
36: optimal phase adjustment unit
37: amplitude condition search block
38: optimal amplitude adjustment unit
51: control unit

What is claimed is:

1. A noise canceller device for removing an interference signal from a received signal, comprising:
   a first antenna configured to receive a desired signal;
   a second antenna configured to receive an interference signal;
   a plurality of interference signal adjustment units configured to adjust a delay, a phase, and an amplitude of the signal received by the second antenna;
   a plurality of adders provided to respectively correspond to the plurality of interference signal adjustment units and configured to output differential signals by subtracting outputs of the respective interference signal adjustment units from the signal received by the first antenna;
   a plurality of average power calculation units provided to respectively correspond to the plurality of adders and configured to calculate an average power of the differential signals;
   an optimal condition search unit configured to determine values of the delay, the phase and the amplitude which result in the minimum average power as optimal conditions based on the outputs of the average power calculation units;
   an optimal interference signal adjustment unit configured to adjust the signal received by the second antenna based on the optimal conditions; and
   a cancellation unit configured to subtract the output of the optimal interference signal adjustment unit from the signal received by the first antenna.

2. The noise canceller device of claim 1, wherein a group of the interference signal adjustment unit, the optimal condition search unit and the optimal interference signal adjustment unit is provided for each of a delay, a phase and an amplitude,
   the first group for any one of the delay, the phase and the amplitude, the second group for another one of the delay, the phase and the amplitude except for the one of the first group, and the third group for the remaining one of the delay, the phase and the amplitude are connected in that order,
   an output of the optimal interference signal adjustment unit of the first group is inputted into the interference signal adjustment unit and the optimal interference signal adjustment unit of the second group,
   an output of the optimal interference signal adjustment unit of the second group is inputted into the interference signal adjustment unit and the optimal interference adjustment unit of the third group, and
   the cancellation unit subtracts an output of the optimal interference signal adjustment unit of the third group from the signal received by the first antenna.

3. The noise canceller device of claim 2, wherein a cycle of calculating an average power value in the average power calculation unit is variable.

4. The noise canceller device of claim 1, wherein a cycle of calculating an average power value in the average power calculation unit is variable.

5. A noise canceller device for removing an interference signal from a received signal, comprising:
   a first antenna configured to receive a desired signal;
   a second antenna configured to receive an interference signal;
   a plurality of interference signal adjustment units configured to adjust a delay, a phase and an amplitude of the signal received by the first antenna;
   a plurality of adders provided to respectively correspond to the plurality of interference signal adjustment units and configured to output differential signals by subtracting the signal received by the second antenna from outputs of the respective interference signal adjustment units;
   a plurality of average power calculation units provided to respectively correspond to the plurality of adders and configured to calculate an average power of the differential signals;
   an optimal condition search unit configured to determine values of the delay, the phase and the amplitude which result in the minimum average power as optimal conditions based on the outputs of the average power calculation units;
   an optimal interference signal adjustment unit configured to adjust the signal received by the first antenna based on the optimal conditions; and
   a cancellation unit configured to subtract the output of the optimal interference signal adjustment unit from the signal received by the second antenna.

6. The noise canceller device of claim 5, wherein a cycle of calculating an average power value in the average power calculation unit is variable.

7. A noise canceller device for removing an interference signal from a received signal, comprising:
   a first antenna configured to receive a desired signal;
   a second antenna configured to receive an interference signal;
   an interference signal adjustment unit configured to adjust a delay, a phase and an amplitude of the signal received by the second antenna based on a value set in a time-sharing manner;
   an adder configured to output differential signals by subtracting outputs of the interference signal adjustment unit from the signal received by the first antenna;
   an average power calculation unit configured to calculate an average power of the differential signals;
   an optimal condition search unit configured to store outputs of the average power calculation unit in a time-sharing manner and determine values of a delay, a phase and an amplitude which result in the minimum average power as optimal conditions;
   an optimal interference signal adjustment unit configured to adjust the signal received by the second antenna based on the optimal conditions;
   a cancellation unit configured to subtract the output of the optimal interference signal adjustment unit from the signal received by the first antenna; and
   a control unit configured to set values of the delay, the phase and the amplitude at a time-sharing timing in the interference signal adjustment unit and instructing the time-sharing timing to the average power calculation unit and the optimal condition search unit.

* * * * *